US012669410B2

(12) United States Patent  
Matsumoto et al.

(10) Patent No.: US 12,669,410 B2  
(45) Date of Patent: *Jun. 30, 2026

(54) TIRE TESTING DEVICE

(71) Applicant: KOKUSAI KEISOKUKI KABUSHIKI KAISHA, Tama (JP)

(72) Inventors: Sigeru Matsumoto, Tokyo (JP); Hiroshi Miyashita, Tokyo (JP); Kazuhiro Murauchi, Tokyo (JP); Shuichi Tokita, Kanagawa (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/981,912

(22) Filed: Dec. 16, 2024

(65) Prior Publication Data

US 2025/0116573 A1     Apr. 10, 2025

Related U.S. Application Data

(63) Continuation of application No. 17/527,854, filed on Nov. 16, 2021, now Pat. No. 12,209,930, which is a (Continued)

(30) Foreign Application Priority Data

May 24, 2019     (JP) ................................ 2019-098135

(51) Int. Cl.  
    *G01M 17/02*     (2006.01)  
    *G01N 19/02*     (2006.01)  
(52) U.S. Cl.  
    CPC .......... *G01M 17/021* (2013.01); *G01M 17/02* (2013.01); *G01N 19/02* (2013.01)

(58) Field of Classification Search  
    CPC ..... G01M 17/02; G01M 17/021; G01N 19/02  
    See application file for complete search history.

(56) References Cited

U.S. PATENT DOCUMENTS

| | | | |
|---|---|---|---|
| 3,893,330 A | 7/1975 | Shute et al. | |
| 3,948,080 A * | 4/1976 | Boyd .................... | G01M 17/02 |
| | | | 73/146 |

(Continued)

FOREIGN PATENT DOCUMENTS

| | | | |
|---|---|---|---|
| JP | 2009180715 A * | 8/2009 | |
| JP | 2013-156087 A | 8/2013 | |

(Continued)

OTHER PUBLICATIONS

Foreign Reference.*

(Continued)

*Primary Examiner* — Jill E Culler  
(74) *Attorney, Agent, or Firm* — Oliff PLC

(57) ABSTRACT

A tire testing device includes a vehicle, and a test unit provided in the vehicle and capable of supporting a test wheel on which a test tire is mounted in a state in which the test wheel is in contact with a road surface. The test unit includes a power unit configured to output power for rotationally driving the test wheel. The power unit includes a rotation output unit configured to output a rotational motion of a rotation speed corresponding to a traveling speed of the vehicle, and a torque applying unit configured to add torque to the rotational motion to output the torque. the rotation output unit includes a driven wheel configured to contact a road surface, a first axle coupled to the driven wheel, and a first transmission mechanism configured to couple the first axle to an input shaft of the torque applying unit.

11 Claims, 12 Drawing Sheets

Related U.S. Application Data continuation-in-part of application No. PCT/JP2020/019526, filed on May 15, 2020.

(56) References Cited

U.S. PATENT DOCUMENTS

| | | | |
|---|---|---|---|
| 4,662,211 | A | 5/1987 | Strong |
| 6,427,519 | B2 | 8/2002 | Ueda et al. |
| 6,840,098 | B2 * | 1/2005 | Halliday ............... G01N 19/02 |
| | | | 73/146 |
| 7,908,900 | B2 | 3/2011 | Olsen |
| 8,984,965 | B2 | 3/2015 | Matsumoto et al. |
| 10,113,950 | B2 | 10/2018 | Gardiner et al. |
| 2014/0033831 | A1 | 2/2014 | Matsumoto et al. |
| 2016/0369848 | A1 | 12/2016 | Kobata |

FOREIGN PATENT DOCUMENTS

| | | | |
|---|---|---|---|
| JP | 2016-080414 A | | 5/2016 |
| JP | 2017-008989 A | | 1/2017 |
| JP | 2019124693 A | * | 7/2019 |
| KR | 10-1468332 B1 | | 12/2014 |
| WO | 2012/141170 A1 | | 10/2012 |

OTHER PUBLICATIONS

Jul. 7, 2020 International Search Report issued in International Patent Application No. PCT/JP2020/019526.

Nov. 16, 2021 International Preliminary Report on Patentability issued in International Patent Application No. PCT/JP2020/019526.

May 2, 2023 Extended European Search Report issued in European Patent Application No. 20813392.6.

* cited by examiner

FIG. 5

TIRE TESTING DEVICE

CROSS-REFERENCE TO RELATED APPLICATIONS

This is a Continuation Application of U.S. patent application Ser. No. 17/527,854, filed Nov. 16, 2021, which is a Continuation-in-Part of International Application No. PCT/JP2020/019526 filed on May 15, 2020, which claims priority from Japanese Patent Application No. 2019-098135 filed on May 24, 2019. The entire disclosures of the prior applications are incorporated herein by reference.

BACKGROUND

Technical Field

The present disclosure relates to a tire testing device.

Related Art

There has been known a test vehicle (hereinafter referred to as an "on-road tire testing device") capable of performing an on-road tire test for testing various performances of an automobile tire by running on an actual road surface such as an automobile test course with the test tire mounted thereon.

The known on-road tire testing device is a vehicle obtained by modifying a bus and providing with a test facility. In the on-road tire test, it is necessary to apply a large torque (driving force, braking force) that rapidly changes to a test wheel while rotating a test wheel on which a test tire is mounted at a high speed. In order to perform such driving by a commonly used electric motor, an electric motor having a large capacity is required, but it is difficult to install such a large electric motor in the vehicle. Therefore, the known on-road tire testing device is configured to drive and brake the test wheel by using a hydraulic motor.

SUMMARY

In the vehicle of the known on-road tire testing device, a hydraulic pressure supply device for supplying hydraulic pressure to the hydraulic motor is installed. Therefore, a large space in the vehicle is occupied by the hydraulic pressure supply device, and a space for installing test equipment and a work space for an operator to work in the vehicle cannot be sufficiently secured.

In addition, if the hydraulic oil leaks from the hydraulic system, the test tire and the road surface may be contaminated by the hydraulic oil and cause a decrease in accuracy of the test.

According to aspects of the present disclosure, there is provided a tire testing device including a vehicle, and a test unit provided in the vehicle and capable of supporting a test wheel on which a test tire is mounted in a state in which the test wheel is in contact with a road surface. The test unit includes a power unit configured to output power for rotationally driving the test wheel. The power unit includes a rotation output unit configured to output a rotational motion of a rotation speed corresponding to a traveling speed of the vehicle, and a torque applying unit configured to add torque to the rotational motion to output the torque. the rotation output unit includes a driven wheel configured to contact a road surface, a first axle coupled to the driven wheel, and a first transmission mechanism configured to couple the first axle to an input shaft of the torque applying unit.

BRIEF DESCRIPTION OF THE ACCOMPANYING DRAWINGS

FIG. 5 is a front view of the test unit.

DETAILED DESCRIPTION

Figure 1:
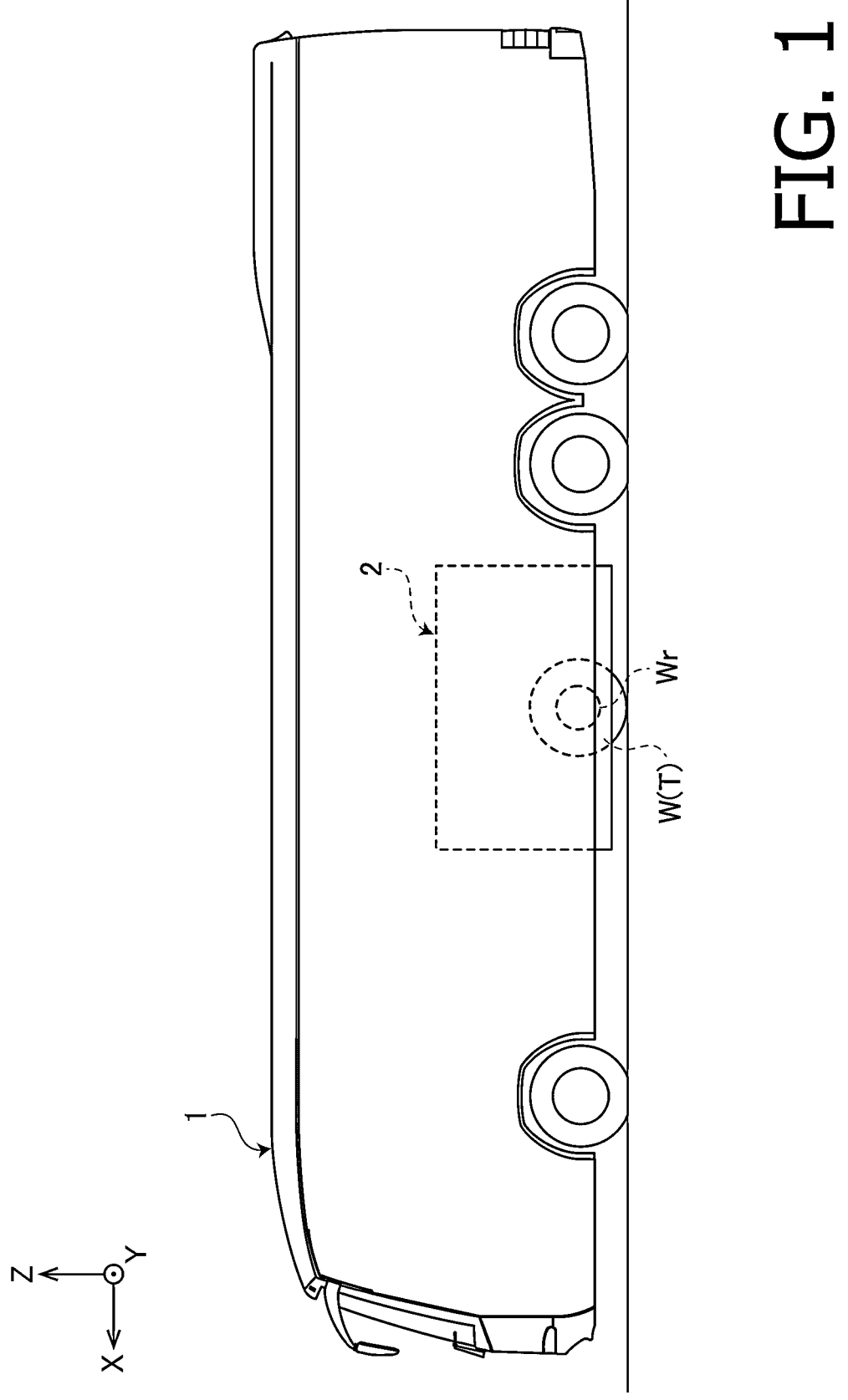
FIG. 1 is a right side view of an on-road tire testing device.

Hereinafter, aspects of the present disclosure will be described with reference to the drawings. In the following description, the same or corresponding components are denoted by the same or corresponding reference numerals, and redundant description thereof will be omitted. In each drawing, for convenience of description, some components are omitted or shown in a cross section. In each drawing, in a case where a plurality of items having the same reference sign are shown, the reference sign is not necessarily assigned to all the plurality of items, but assignment of the reference sign to some of the plurality of items is appropriately omitted.

An on-road tire testing device according to aspects of the present disclosure described below is a self-propelled tire testing device modified from a large-sized passenger automobile (hereinafter referred to as a "bus vehicle"). The on-road tire testing device is a device capable of testing various performances of a test tire T with respect to a road surface in various states by traveling on a road surface such as an automobile test course in a state where a test wheel W (FIG. 1) on which the test tire T is mounted is made to contact the road surface.

The on-road tire testing device is a device in which a test unit 2 and its accessory device are mounted on a vehicle 1 obtained by modifying a rear engine, rear wheel drive (hereinafter referred to as "RR") bus vehicle being a base vehicle. Since the RR (or a front engine, front wheel drive (hereinafter referred to as "FF")) bus vehicle does not have a drive shaft disposed at the central part of the vehicle, there is an advantage that the degree of freedom of arrangement of the test unit 2 is high.

Figure 2:
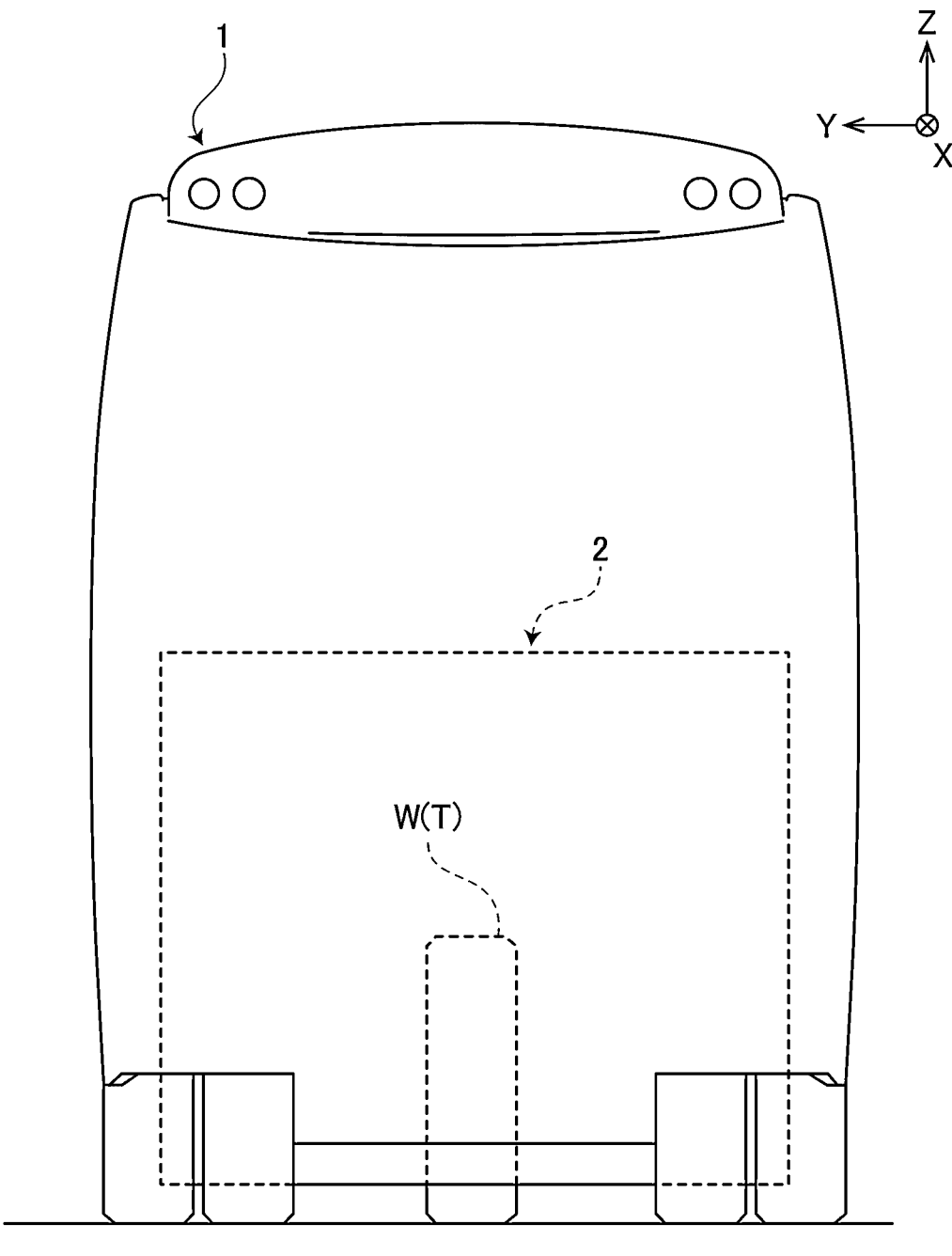
FIG. 2 is a rear view of the on-road tire testing device.
Figure 3:
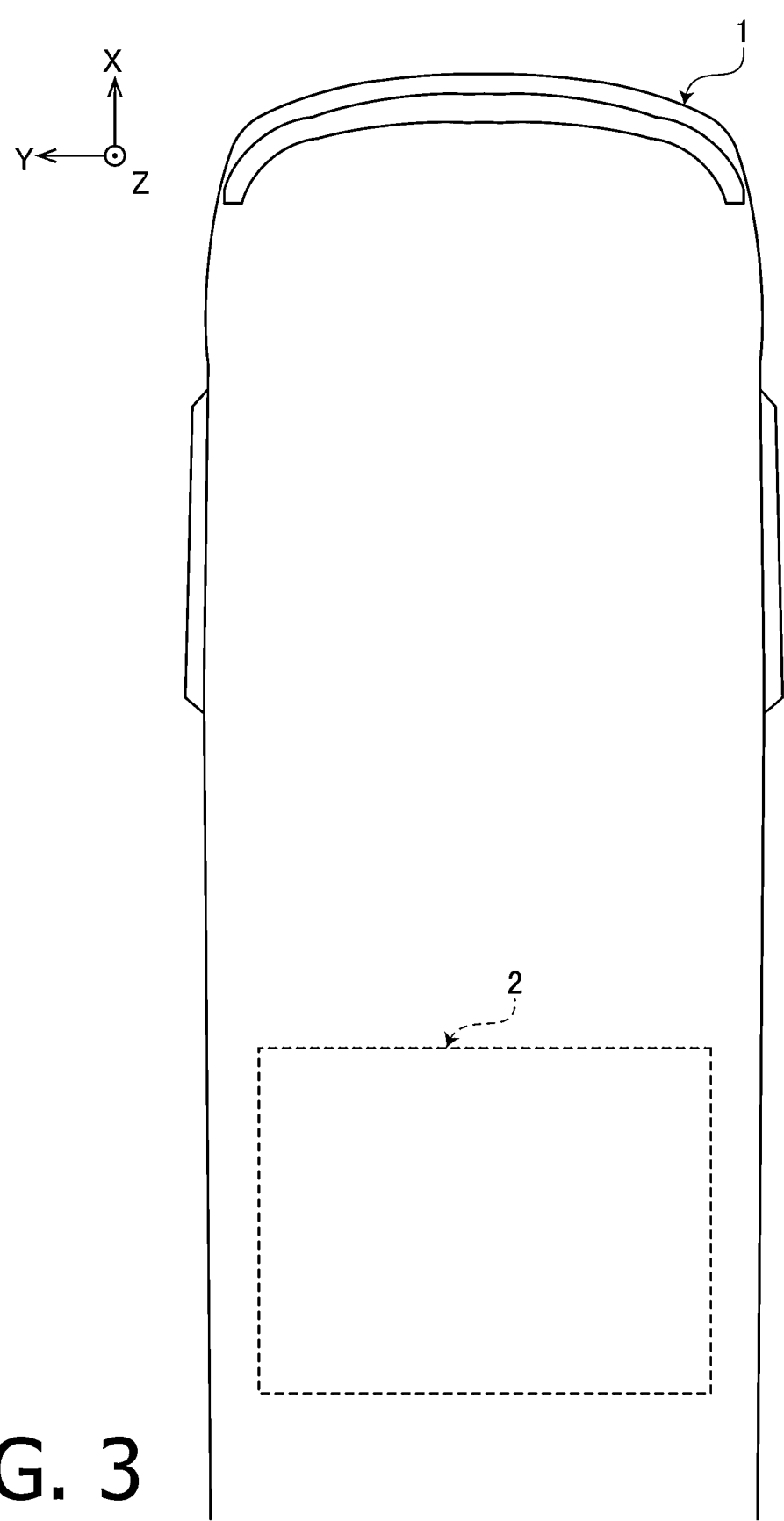
FIG. 3 is a plan view of a front portion of the on-road tire testing device.

FIGS. 1, 2, and 3 are a side view, a rear view, and a plan view, respectively, showing an arrangement of the test unit 2 in the on-road tire testing device. In FIG. 3, a rear portion of the vehicle 1 is not shown.

In the following description, front, rear, up, down, left, and right directions are defined as directions when facing a traveling direction of the vehicle 1 (i.e., when seated on a not-shown driver's seat). A front side is defined as an X-axis positive direction, a rear side is defined as an X-axis negative direction, a left side is defined as a Y-axis positive direction, a right side is defined as a Y-axis negative direction, an upper side is defined as a Z-axis positive direction, and a lower side is defined as a Z-axis negative direction.

Figure 4:
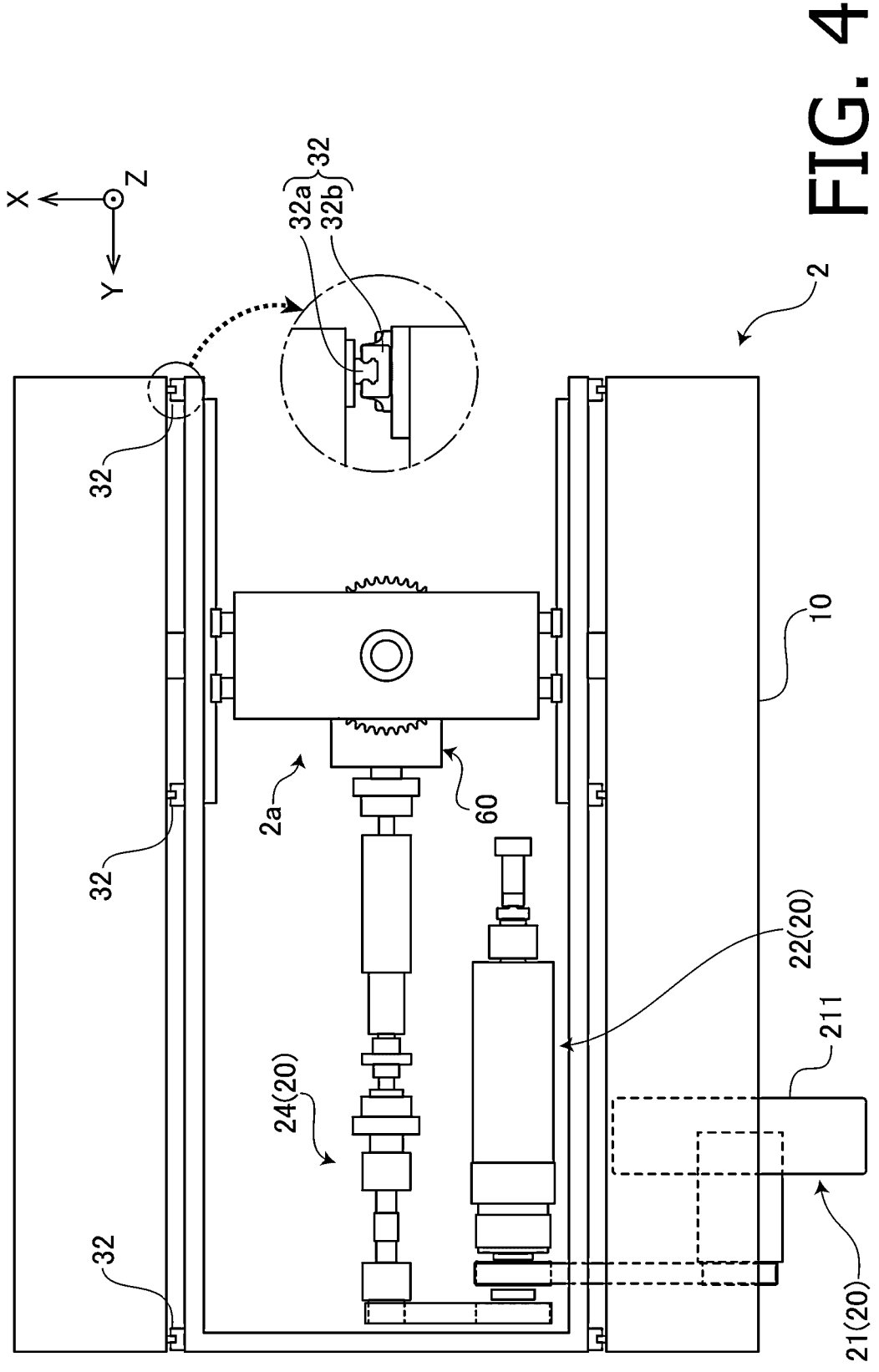
FIG. 4 is a plan view of a test unit.
Figure 5:
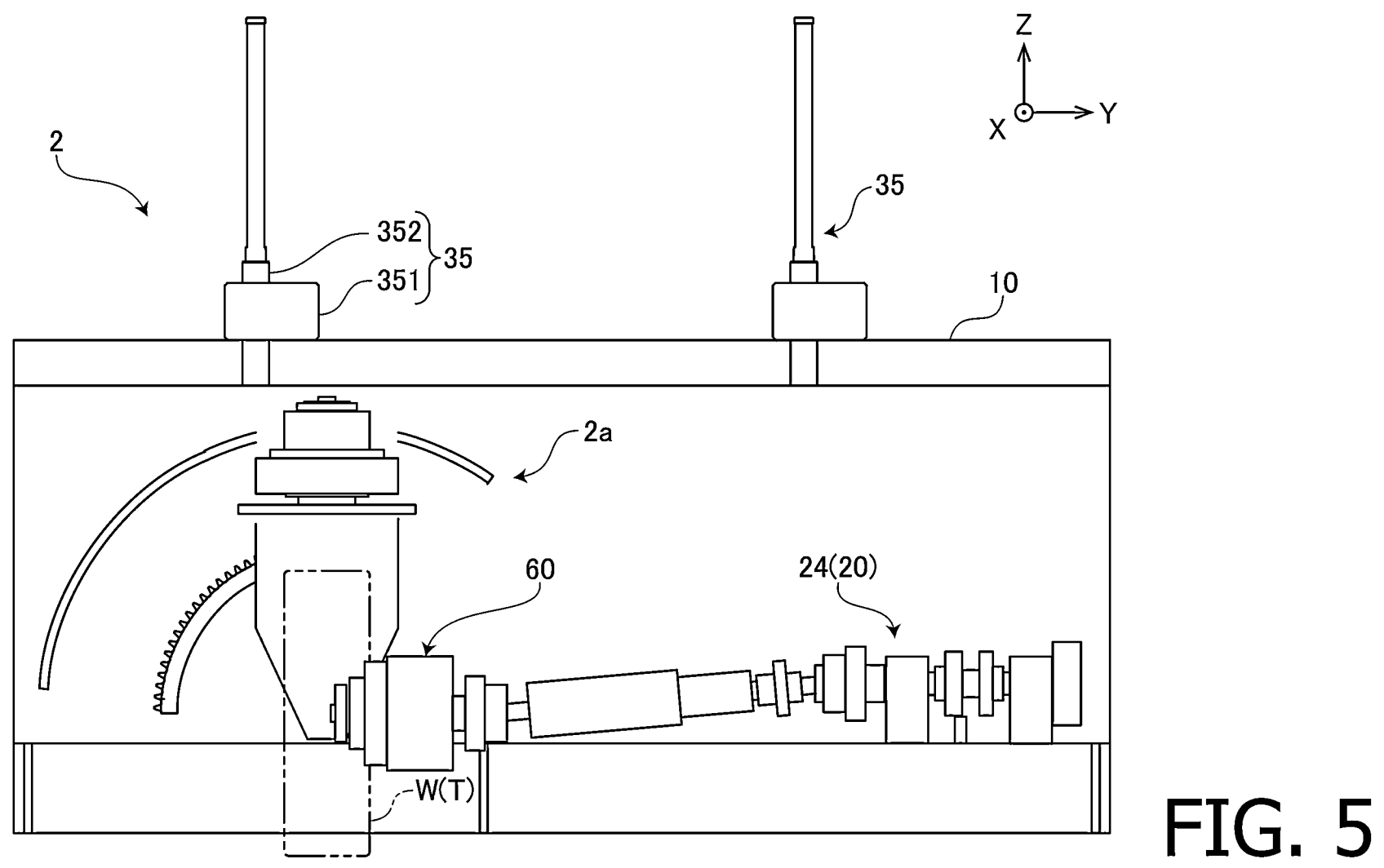

FIGS. 4 and 5 are a plan view and a front view, respectively, of the test unit 2. The test unit 2 includes a base frame 10 fixed to a frame (not shown) of the vehicle 1, an alignment unit 2a held by the base frame 10, an axle unit 60 supported by the alignment unit 2a, and a power unit 20 configured to drive axles (spindles 61 illustrated in FIG. 10) of the test wheel W.

A part of the power unit 20 (a pickup unit 21 which will be described later) is installed on the base frame 10, and the remaining part (a torque applying unit 22 and a power transmission unit 24 which will be described later) is installed on a lifting frame 31, which will be described later, of the alignment unit 2a.

The axle unit 60 (FIG. 5) is a unit configured to rotatably support the test wheel W, and includes a spindle 61 (FIG. 10) being an axle that rotates integrally with the test wheel W. The axle unit 60 is supported by the alignment unit 2a so that its height and orientation can be changed.

The alignment unit 2a is a unit capable of adjusting a load (a test load) applied to the test wheel W and an orientation (a slip angle and a camber angle) of the test wheel W.

The power unit 20 is a unit configured to supply power to the test wheel W, and its output shaft is coupled to the spindle 61.

As shown in FIG. 4, the power unit 20 includes a pickup unit 21, a torque applying unit 22, and a power transmission unit 24. The pickup unit 21 (a rotation output unit) includes a pickup wheel 211 (a driven wheel) that comes into contact with the road surface, and acquires a rotational motion at a rotational speed corresponding to a traveling speed of the vehicle 1 from the road surface and outputs the acquired rotational motion. The torque applying unit 22 generates a braking force and a driving force (hereinafter, referred to as a "braking/driving force") to be applied to the test wheel W, and adds the braking/driving force (i.e., torque) to the rotational motion output from the pickup unit 21 to output the braking/driving force. The torque applying unit 22 makes it possible to apply a torque to the test wheel W by changing a phase of the rotational motion acquired by the pickup unit 21 (i.e., the torque applying unit 22 makes it possible to apply a driving force or a braking force between the road surface and the test wheel W.). The power output from the torque applying unit 22 is transmitted to the test wheel W via the power transmission unit 24 and the spindle 61. The power acquired from the road surface by the pickup unit 21 is transmitted to the road surface via the test wheel W. That is, the power unit 20 constitutes a power circulation system together with the test wheel W and the road surface.

Figure 6:
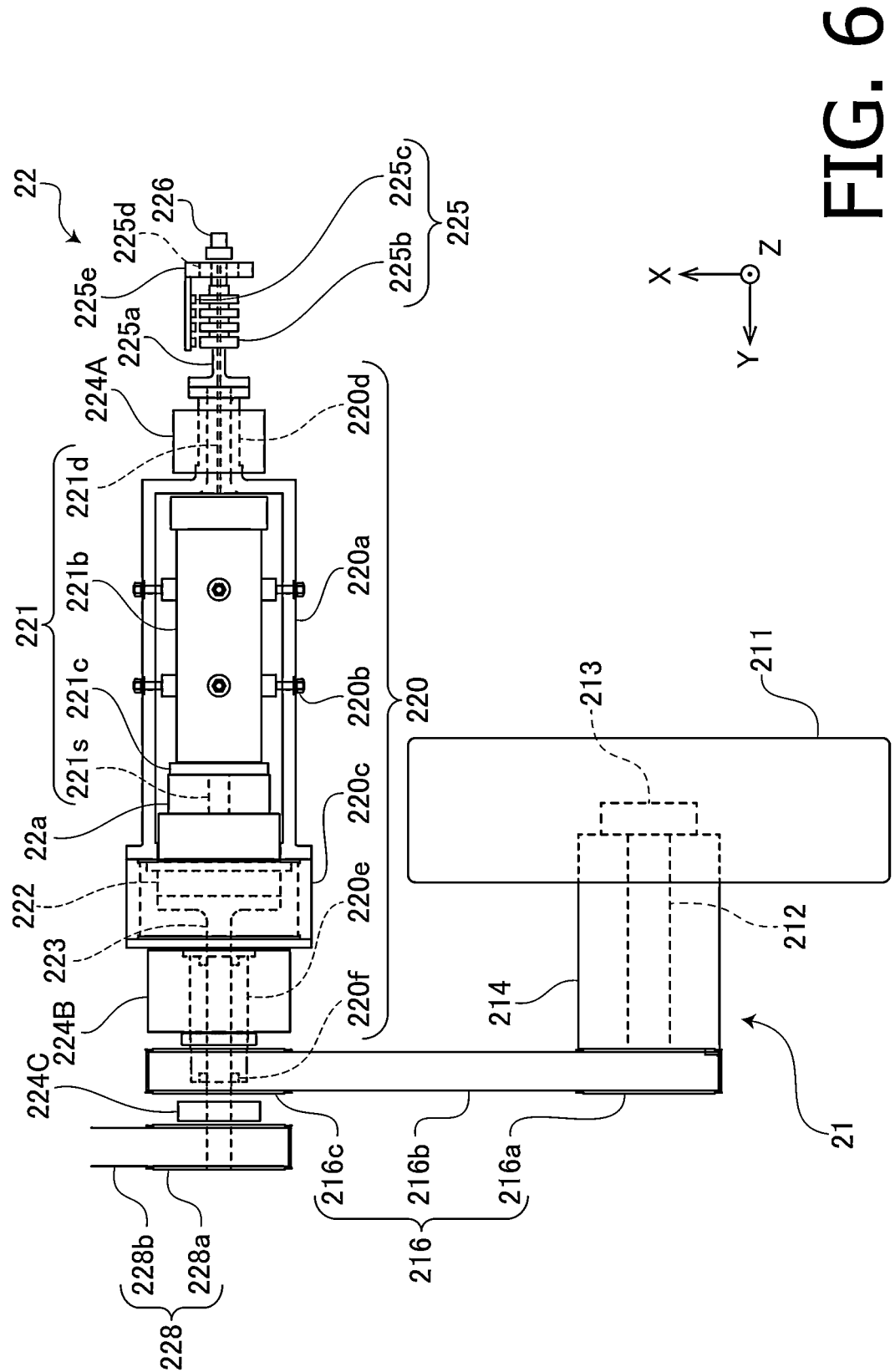
FIG. 6 is a diagram illustrating a schematic structure of a pickup unit and a torque applying unit.

FIG. 6 is a diagram illustrating a schematic structure of the pickup unit 21 and the torque applying unit 22. The pickup unit 21 includes a bearing 214, an axle 212 rotatably supported by the bearing 214, a wheel hub 213 coaxially coupled to one end of the axle 212, the pickup wheel 211 attached to the wheel hub 213, and a first belt transmission mechanism 216 configured to transmit rotation of the axle 212 to the torque applying unit 22.

The first belt transmission mechanism 216 includes a drive pulley 216a attached to the other end of the axle 212, a driven pulley 216c attached to a housing 220, which will be described later, of the torque applying unit 22, and a toothed belt 216b stretched between the drive pulley 216a and the driven pulley 216c.

The pickup wheel 211 is a driven wheel that contacts the road surface, is driven by the road surface when the vehicle

1 travels, and rotates at a peripheral speed that is the same as a traveling speed of the vehicle 1. The rotation of the pickup wheel 211 is transmitted to the torque applying unit 22 via the wheel hub 213, the axle 212, and the first belt transmission mechanism 216.

The torque applying unit 22 includes bearings 224A and 224B, a cylindrical housing 220 (a rotating frame) rotatably supported by the bearings 224A and 224B, a motor 221, a speed reducer 222, and a shaft 223 attached to the housing 220, and a second belt transmission mechanism 228 configured to transmit a rotation of the shaft 223 to the power transmission unit 24. If the motor 221 has a capability of generating a torque to be applied to the test wheel W, the shaft 223 may be directly coupled to a shaft 221s of the motor 221 without providing the speed reducer 222. In this case, the shaft 221s of the motor 221 and the shaft 223 may be integrally formed.

The housing 220 includes substantially cylindrical first body portion 220a (a motor housing portion) and second body portion 220c, and substantially cylindrical shaft portions 220d and 220e that are thinner than the first body portion 220a. The shaft portion 220d is coupled to the right end of the first body portion 220a coaxially (i.e., such that the first body portion 220a and the shaft portion 220d share the center line), and the shaft portion 220e is coaxially coupled to the left end of the first body portion 220a via the second body portion 220c. The right shaft portion 220d is rotatably supported by the bearing 224A, and the left shaft portion 220e is rotatably supported by the bearing 224B.

The driven pulley 216c of the first belt transmission mechanism 216 is attached to a distal end of the left shaft portion 220c. The housing 220 is rotationally driven by the pickup unit 21. That is, the housing 220 is rotationally driven at a rotation speed proportional to the traveling speed of the vehicle 1 by the power acquired by the pickup unit 21 and transmitted by the first belt transmission mechanism 216.

The motor 221 is accommodated in a hollow portion of the first body portion 220a. The motor 221 may be disposed coaxially with the housing 220 (i.e., such that rotation axes of the motor 221 and the housing 220 coincide with each other). By disposing the motor 221 coaxially with the housing 220, unbalance of a rotating portion of the torque applying unit 22 is reduced, and the rotating portion can be smoothly rotated (i.e., can be rotated with less unnecessary fluctuations in the rotation speed and the torque). A stator 221b of the motor 221 is fixed to the first body portion 220a with a plurality of bolts 220b. A flange 221c on an output side of the motor 221 is coupled to a case of the speed reducer 222 via a coupling tube 22a. The case of the speed reducer 222 is fixed to a flange formed at a left end of the first body portion 220a. That is, the stator 221b of the motor 221 and the case of the speed reducer 222 are fixed to the housing 220.

The shaft 221s of the motor 221 is connected to an input shaft of the speed reducer 222, and a shaft 223 coaxially accommodated in the housing 220 is connected to an output shaft of the speed reducer 222. A torque output from the motor 221 is amplified by the speed reducer 222 and transmitted to the shaft 223.

The shaft 223 is rotatably supported by a pair of bearings 220f provided on an inner periphery of the left shaft portion 220e of the housing 220. A distal end side of the shaft 223 protrudes to the outside from an opening provided at the left end of the housing 220 and is rotatably supported by a bearing 224C.

The shaft 223 is connected to the second belt transmission mechanism 228. The second belt transmission mechanism 228 includes a drive pulley 228a attached to a distal end of the shaft 223, a driven pulley 228c attached to a shaft 241L, which will be described later, of the power transmission unit 24 (FIG. 7), and a toothed belt 228b stretched between the drive pulley 228a and the driven pulley 228c. An output of the torque applying unit 22 is transmitted to the power transmission unit 24 via the second belt transmission mechanism 228.

The torque applying unit 22 includes an electrical connecting unit 225 configured to electrically connect the motor 221 attached to the rotating housing 220 to an amplifier 221a (FIG. 12) installed outside the torque applying unit 22. The electrical connecting unit 225 includes a substantially cylindrical shaft portion 225a coupled to the right shaft portion 220d of the housing 220, a bearing 225d configured to rotatably support the shaft portion 225a, a plurality of slip rings 225b coaxially attached to an outer periphery of the shaft portion 225a, a plurality of brushes 225c in contact with outer peripheral surfaces of the slip rings 225b, and a support part 225e configured to support the brushes 225c and the bearing 225d.

A cable 221d of the motor 221 passes through a hollow portion of the shaft portion 220d of the housing 220. A plurality of electric wires constituting the cable 221d pass through a hollow portion of the shaft portion 225a of the electrical connecting unit 225 and are connected to the corresponding slip rings 225b, respectively. The brushes 225c are connected to the amplifier 221a (FIG. 12) via a not-shown cable.

The torque applying unit 22 includes a rotary encoder 226 configured to detect a rotation speed of the housing 220. A main body of the rotary encoder 226 is attached to the support part 225e of the electrical connecting unit 225, and a shaft of the rotary encoder 226 is connected to the shaft portion 225a.

According to the torque applying unit 22 configured as described above, the stator 221b of the motor 221 fixed to the housing 220 is rotationally driven at the rotation speed proportional to the traveling speed of the vehicle 1 by the rotational motion acquired from the road surface by the pickup unit 21 and, at the same time, the shaft 221s of the motor 221 is rotationally driven (in the present embodiment, the rotation of the shaft 221s is further decelerated by the speed reducer 222), the resultant of these two rotations is output from the shaft 223, and the test wheel W is rotationally driven by the resultant rotational motion.

In the present embodiment, outer diameters of the pickup wheel 211 and the test wheel W are the same, numbers of teeth of the drive pulley 216a and the driven pulley 216c of the first belt transmission mechanism 216 are the same, and numbers of teeth of the drive pulley 228a and the driven pulley 228c of the second belt transmission mechanism 228 are the same. That is, the power unit 20 of the present embodiment is configured such that the test wheel W is rotationally driven at a peripheral speed equal to the traveling speed of the vehicle 1 in a state where the driving of the motor 221 is stopped.

By incorporating the torque applying unit 22 into the power unit 20, it becomes possible to separate power source into a power source (the pickup unit 21) for controlling the rotation speed of the test wheel W and a power source (the motor 221) for controlling the torque. Thereby, it becomes possible to reduce a capacity of each power source, and it becomes possible to control the rotation speed and the torque applied to the test wheel W with higher accuracy. In addition, in the present embodiment, since the pickup unit 21 that takes in a part of a kinetic energy of the vehicle 1 and reuses the kinetic energy as a power source is adopted as the power source for controlling the rotation speed, a motor for controlling the rotation speed is not required. Therefore, downsizing, weight reduction, and cost reduction of the power source for controlling the rotation speed are realized.

As described above, the motor 221 is a power source for generating a braking/driving force (torque) to be applied to the test wheel W. The motor 221 is required to accurately reproduce a sudden torque change applied to the tire during braking/driving, and high acceleration performance is required for the motor 221 to reproduce the sudden torque change. In the present embodiment, as the motor 221, an ultra-low-inertia high-output AC motor in which the inertia moment of the rotor is 0.01 kg·m² or less and the rated output is 7 kW to 37 kW is used. By using such an ultra-low-inertia high-output AC servo motor, it becomes possible to apply braking/driving force that changes at a high frequency exceeding 100 Hz to the test wheel W.

Figure 7:
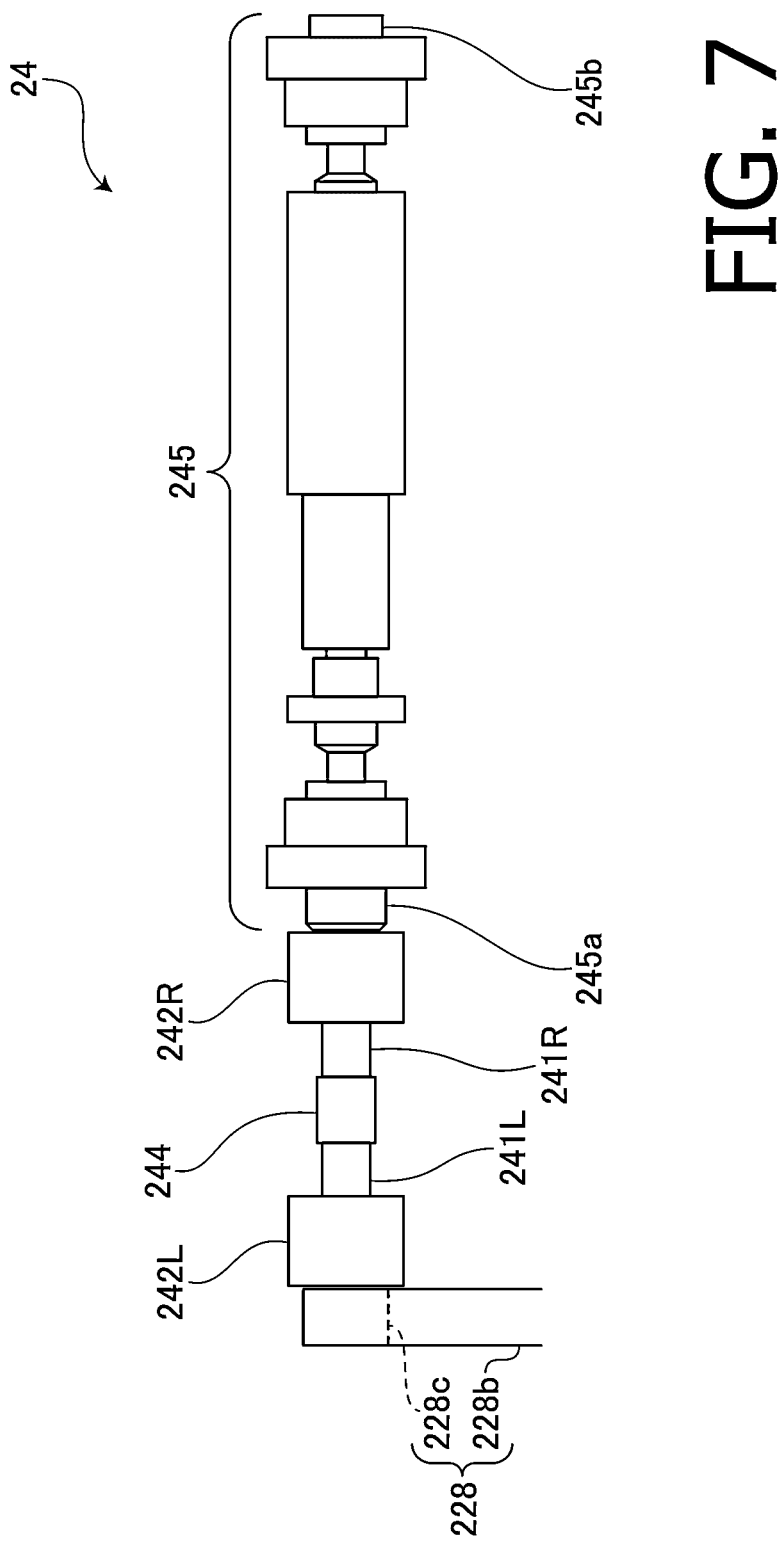
FIG. 7 is a diagram illustrating a schematic structure of a power transmission unit.

FIG. 7 is a diagram illustrating a schematic structure of the power transmission unit 24. The power transmission unit 24 includes shafts 241L and 241R, bearings 242L and 242R, a torque sensor 244, and a sliding constant velocity joint 245. The shafts 241L and 241R are rotatably supported by the bearings 242L and 242R, respectively, and are coupled to each other via the torque sensor 244. A torque transmitted by the power transmission unit 24 is detected by the torque sensor 244. The driven pulley 228c of the second belt transmission mechanism 228 is attached to a left end of the shaft 241L. A right end of the shaft 241R is connected to an input shaft 245a of the sliding constant velocity joint 245. An output shaft 245b of the sliding constant velocity joint 245 is connected to the spindle 61 (FIG. 10).

The sliding constant velocity joint 245 is configured to be able to smoothly transmit rotation without rotational fluctuation regardless of an operating angle (an angle formed by the input shaft 245a and the output shaft 245b). The sliding constant velocity joint 245 is also variable in length. By connecting the spindle 61 via the sliding constant velocity joint 245, even if the position and/or orientation of the spindle 61 is changed by the alignment unit 2a, smooth power transmission to the spindle 61 is maintained.

Figure 8:
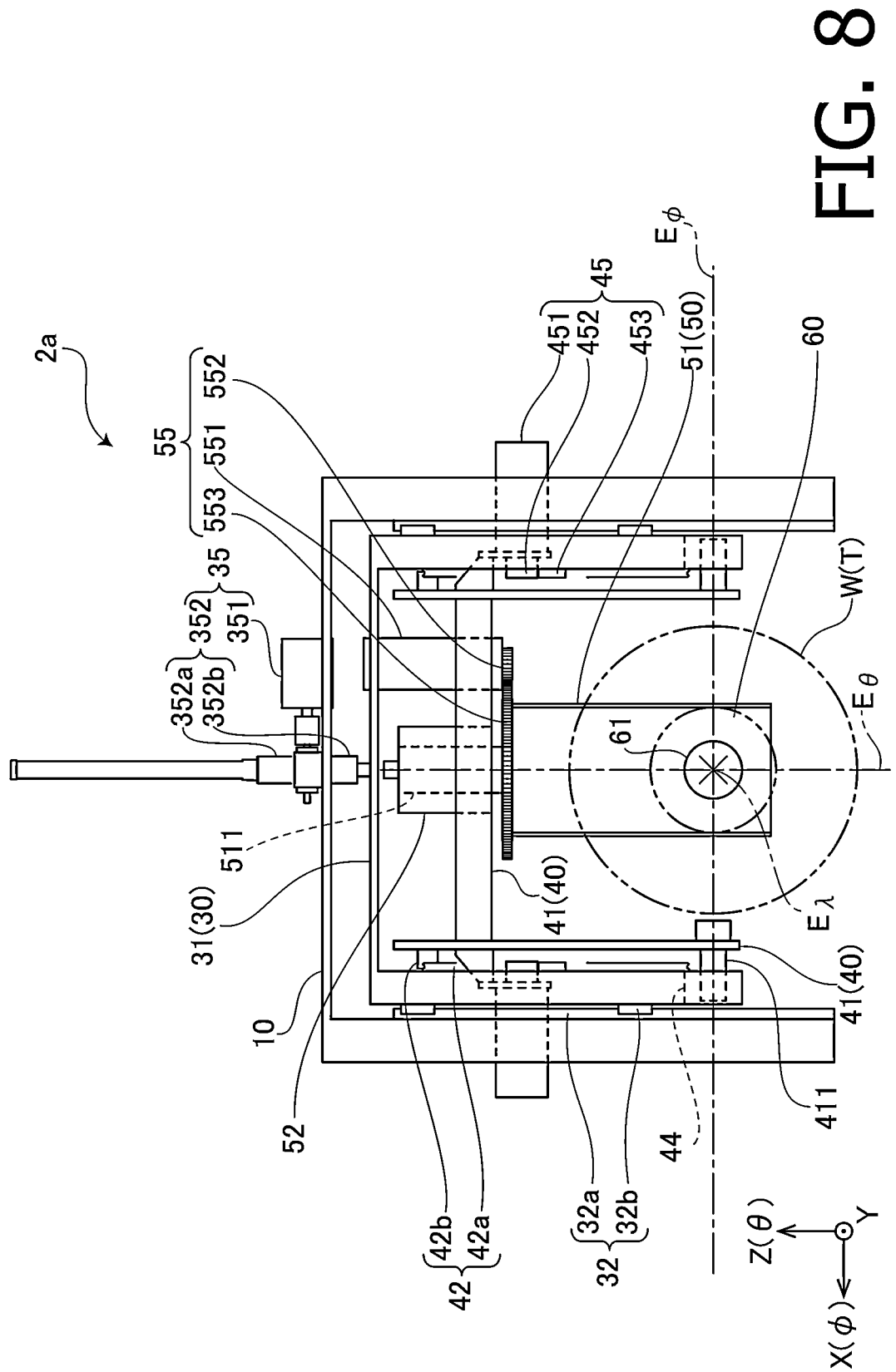
FIG. 8 is a diagram illustrating a schematic structure of an alignment unit.
Figure 9:
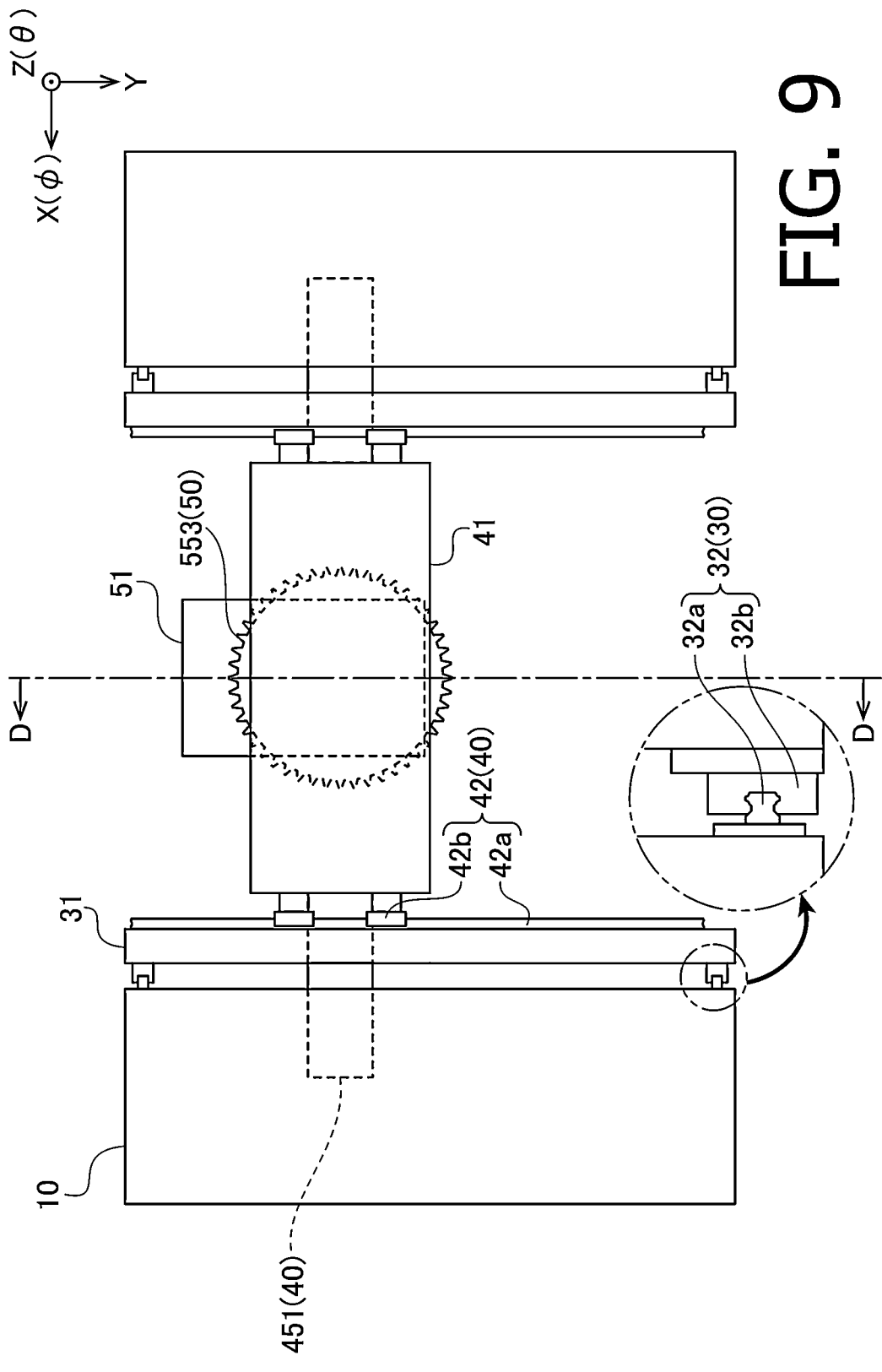
FIG. 9 is a diagram illustrating a schematic structure of the alignment unit.
Figure 10:
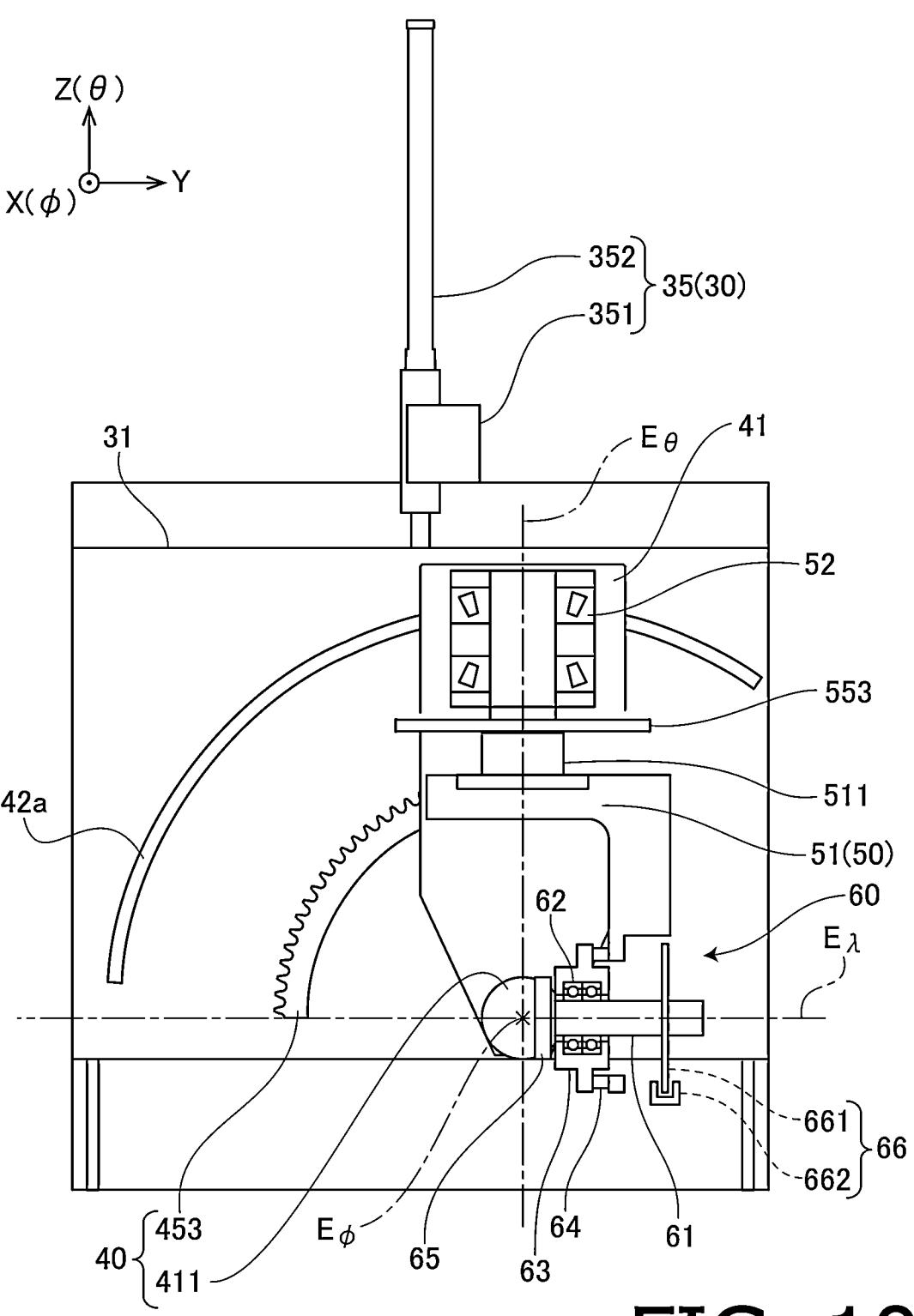
FIG. 10 is a diagram illustrating a schematic structure of the alignment unit.
Figure 11:
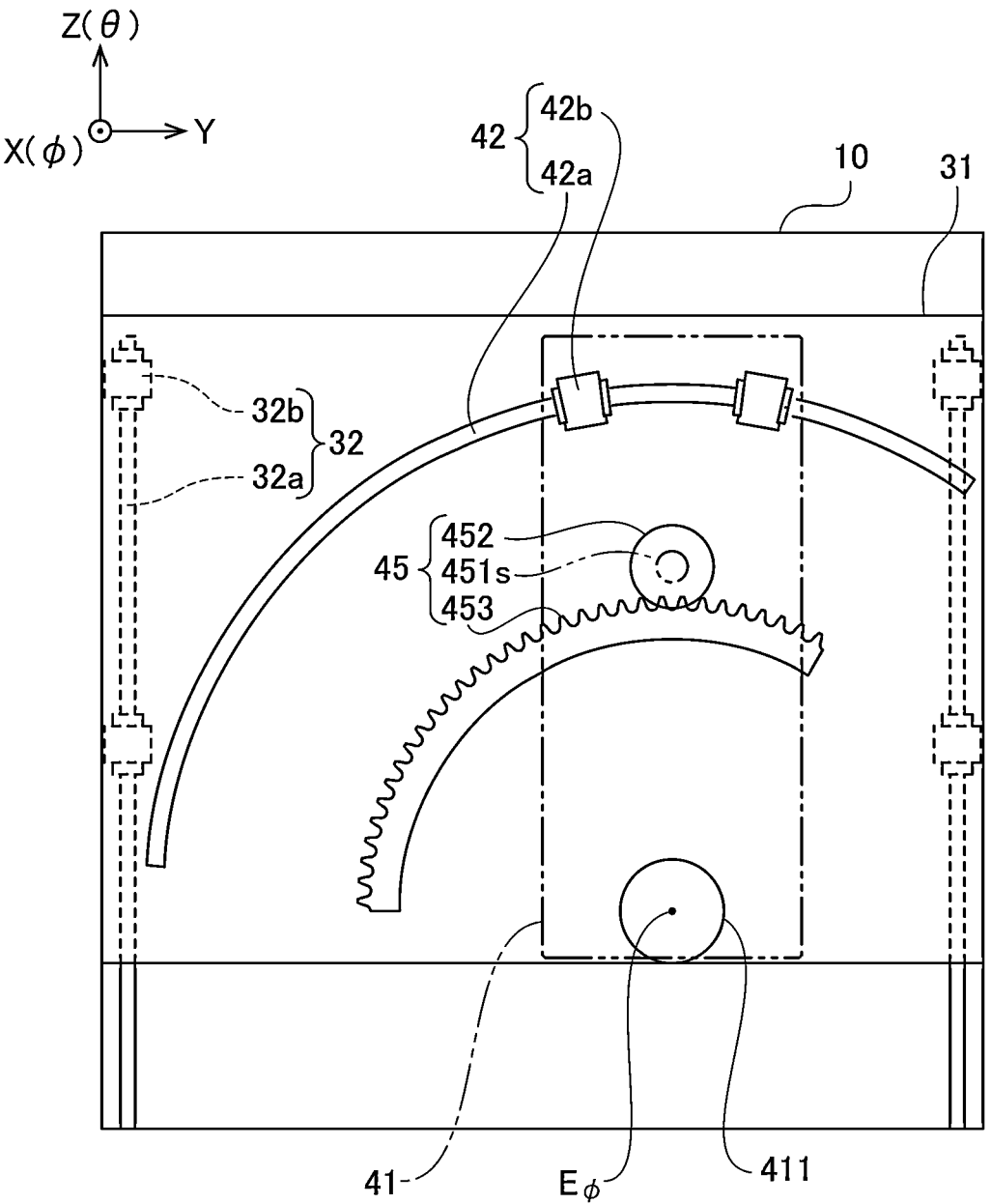
FIG. 11 is an arrow view taken along a line D-D of FIG. 9.

FIG. 8, FIG. 9 and FIG. 10 are diagrams illustrating a schematic structure of the alignment unit 2a. FIG. 11 is an arrow view taken along a line D-D of FIG. 9.

The alignment unit 2a includes a load adjustment mechanism 30, a camber angle adjustment mechanism 40, and a slip angle adjustment mechanism 50.

The load adjustment mechanism 30 is a mechanism that adjusts the load applied to the test wheel W by changing a height of the spindle 61. The load adjustment mechanism 30 includes a lifting frame 31 (a first movable frame) that is movable vertically with respect to the base frame 10, a plurality of linear guides 32 (in the present embodiment, three pairs of linear guides 32) configured to guide the vertical (Z axis direction) movement of the lifting frame 31, and a Z drive unit 35 configured to drive the lifting frame 31 vertically.

The lifting frame 31 is accommodated in a hollow portion of the base frame 10 having a gate shape (∩ shape) as viewed from a side (i.e., as viewed in the Y-axis direction) The linear guide 32 includes a rail 32a extending vertically and one or more (in the present embodiment, two) carriages 32b capable of traveling on the rail 32a. The rail 32a of each linear guide 32 is attached to the base frame 10, and the carriage 32b is attached to the lifting frame 31.

The Z drive unit 35 includes a motor 351 and a motion converter 352 configured to convert rotational motion of the motor 351 into linear motion in the Z axis direction. The motion converter 352 is a screw jack in which a speed reducer such as a worm gear device and a feed screw mechanism such as a ball screw are combined. However, a motion converter of another type may be used. A main body 352*a* of the motion converter 352 is fixed to the base frame 10, and a movable part (a rod 352*b* that can move vertically) is fixed to the lifting frame 31.

When the motion converter 352 is driven by the motor 351, the lifting frame 31 moves vertically together with the rod 352*b*. Accordingly, the test wheel W supported by the lifting frame 31 moves vertically via the camber angle adjustment mechanism 40, the slip angle adjustment mechanism 50, and the axle unit 60, and a load corresponding to a height of the test wheel W acts on the test wheel W.

The camber angle adjustment mechanism 40 is a mechanism for adjusting a camber angle, which is an inclination of the test wheel W with respect to the road surface, by changing an orientation of the spindle 61 around an $E_\varphi$ axis (an axis extending in the front-rear direction and passing through the center of the test wheel W). The camber angle adjustment mechanism 40 includes a $\varphi$ rotating frame 41 (a second movable frame) rotatable about the $E_\varphi$ axis, a pair of bearings 44 rotatably supporting the $\varphi$ rotating frame 41, a pair of curved guides 42 guiding the rotation of the $\varphi$ rotating frame 41, and a pair of left and right $\varphi$ drive units 45 rotationally driving the $\varphi$ rotating frame 41.

As shown in FIG. 8, the $\varphi$ rotating frame 41 and the lifting frame 31 also have a gate shape (a $\cap$ shape) when viewed in the Y axis direction. The $\varphi$ rotating frame 41 is accommodated in a cavity of the $\cap$ shaped lifting frame 31. Pivots 411 that project outward (i.e., in a direction away from an $E_\theta$ axis described later) coaxially with the $E_\varphi$ axis are provided to wall portions of the $\varphi$ rotating frame 41 on the front side and the rear side, respectively. The pivots 411 are rotatably supported by a pair of bearings 44 fixed to the lifting frame 31, respectively. The $\varphi$ rotating frame 41 is supported to be rotatable about the $E_\varphi$ axis with the pivots 411 as support shafts. It is noted that the bearings 44 may be attached to the $\varphi$ rotating frame 41, and the pivots 411 may be attached to the lifting frame 31.

The curved guide 42 includes an arc-shaped curved rail 42*a* disposed concentrically with the $E_\varphi$ axis, and one or more (in the present embodiment, two) carriages 42*b* that can travel on the curved rail 42*a*. Either of the curved rails 42*a* and the carriages 42*b* is attached to the lifting frame 31, and the other is attached to the $\varphi$ rotating frame 41.

As illustrated in FIG. 11, the $\varphi$ drive unit 45 includes a pair of spur gears 453 attached to wall portions of the lifting frame 31 on the front side and the rear side, respectively, a pair of pinions 452 meshing with the pair of spur gears 453, respectively, and a pair of motors 451 configured to rotationally drive the pair of pinions 452, respectively. Each spur gear 453 is a segment gear formed in an arc shape about the $E_\varphi$ axis (i.e., coaxial with the $E_\varphi$ axis). Each motor 451 is attached to the $\varphi$ rotating frame 41, and each pinion 452 is coupled to a shaft 451*s* of the motor 451.

When the pinions 452 are rotationally driven by the motors 451, the pinions 452 roll on the pitch cylinders of the spur gears 453, and the $\varphi$ rotating frame 41 rotates about the $E_\varphi$ axis together with the motors 451 having the pinions 452 attached to the shaft thereof with respect to the lifting frame 31 to which the spur gears 453 are integrally coupled. Accordingly, the test wheel W supported by the $\varphi$ rotating frame 41 via the slip angle adjustment mechanism 50 and the axle unit 60 rotates about the $E_\varphi$ axis, and the camber angle changes. It is noted that the spur gears 453 may be attached to the $\varphi$ rotating frame 41, and the motors 451 may be attached to the lifting frame 31.

The slip angle adjustment mechanism 50 is a mechanism configured to adjust a slip angle, which is an inclination of the test wheel W (more specifically, a wheel center plane perpendicular to the axle) with respect to the traveling direction (X axis direction) of the vehicle 1, by changing an orientation of the spindle 61 about the $E_\theta$ axis (an axis extending vertically through the center of the test wheel W). As illustrated in FIG. 8, the slip angle adjustment mechanism 50 includes a $\theta$ rotating frame 51 (a third movable frame) rotatable about the Ee axis, a bearing 52 rotatably supporting the $\theta$ rotating frame 51, and a $\theta$ drive unit 55 configured to rotationally drive the $\theta$ rotating frame 51.

The $\theta$ rotating frame 51 is accommodated in a cavity of the $\varphi$ rotating frame 41 having a gate shape ($\cap$ shape) when viewed in the Y-axis direction. A pivot 511 projecting coaxially with the $E_\theta$ axis is provided on an upper surface of the $\theta$ rotating frame 51. The pivot 511 is rotatably supported by the bearing 52 fixed to a top plate of the $\varphi$ rotating frame 41. The $\theta$ rotating frame 51 is supported to be rotatable about the Ee axis with the pivot 511 as a support shaft.

The $\theta$ drive unit 55 includes a spur gear 553 attached to the $\theta$ rotating frame 51, a pinion 552 meshing with the spur gear 553, and a motor 551 for rotationally driving the pinion 552. The spur gear 553 is coaxially coupled to the pivot 511. The motor 551 is attached to the $\varphi$ rotating frame 41, and the pinion 552 is coupled to a shaft of the motor 551. It is noted that the spur gear 553 may be attached to the $\varphi$ rotating frame 41, and the motor 551 may be attached to the $\theta$ rotating frame 51.

As illustrated in FIG. 10, the axle unit 60 is attached to a lower end of the $\theta$ rotating frame 51. The axle unit 60 includes a frame 63 attached to the $\theta$ rotating frame 51, a bearing 62 attached to the frame 63, the spindle 61 rotatably supported by the bearing 62, a six-component force sensor 64 configured to detect a force acting on the spindle 61, a disc brake 66 (a braking device) configured to suppress rotation of the spindle 61, and a wheel hub 65 coaxially attached to a distal end of the spindle 61. A wheel rim Wr (FIG. 1) of the test wheel W is to be attached to the wheel hub 65.

The frame 63 of the axle unit 60 is attached to the $\theta$ rotating frame 51 via the six-component force sensor 64. The six-component force sensor 64 includes a plurality of (in the present embodiment, four) piezoelectric elements. The plurality of piezoelectric elements are arranged at constant intervals on a circumference with an $E_\lambda$ axis as a center thereof, are sandwiched between the frame 63 of the axle unit 60 and the $\theta$ rotating frame 51, are fastened by bolts for attaching the frame 63 of the axle unit 60 to the $\theta$ rotating frame 51, and preloads are applied thereto. A hole through which the bolt passes is formed to each piezoelectric element so that the preload is uniformly applied.

The disc brake 66 includes a disc rotor 661 coaxially attached to a distal end of the spindle 61 and a motorized caliper 662 attached to the frame 63. A braking force acts on the spindle 61 when the disc rotor 661 is sandwiched from both sides by a pair of brake pads built in the caliper 662.

The alignment unit 2*a* is configured such that the Ee axis, the $E_\varphi$ axis, and the $E_\lambda$ axis intersect at one point at the center of the test wheel W so that the position of the test wheel W does not move even when the camber angle ($\varphi$ angle) or the slip angle ($\theta$ angle) is changed.

Figure 12:
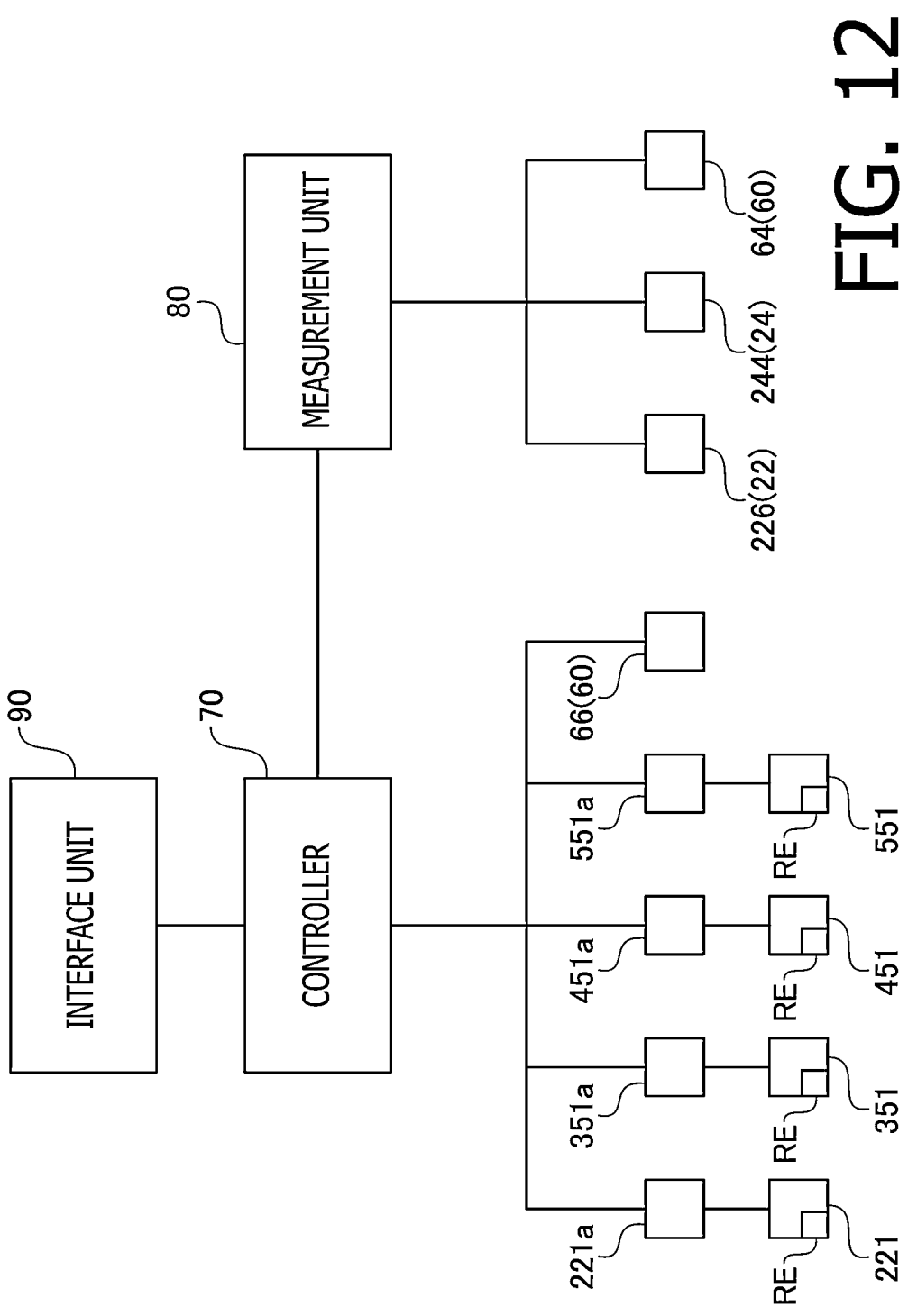
FIG. 12 is a block diagram of a control system.

FIG. 12 is a block diagram illustrating a schematic configuration of a control system of the on-road tire testing device. The control system includes a controller 70 configured to control operation of the entire device, a measurement unit 80 configured to perform various measurements, and an interface unit 90 configured to perform input and output with the outside.

The motor 221 of the torque applying unit 22, the motor 351 of the load adjustment mechanism 30, the motor 451 of the camber angle adjustment mechanism 40, and the motor 551 of the slip angle adjustment mechanism 50 are connected to the controller 70 via amplifiers 221*a*, 351*a*, 451*a*, and 551*a*, respectively. The caliper 662 of the disc brake 66 is also connected to the controller 70.

The controller 70 and each of the amplifiers 221*a*, 351*a*, 451*a*, and 551*a* are communicably connected by optical fibers, and high-speed feedback control can be performed between the controller 70 and each of the amplifiers 221*a*, 351*a*, 451*a*, and 551*a*. This enables synchronous control with higher accuracy (high resolution and high accuracy on the time axis).

The six-component force sensor 64 of the axle unit 60, the rotary encoder 226 of the torque applying unit 22, and the torque sensor 244 of the power transmission unit 24 are connected to the measurement unit 80. In the measurement unit 80, after analog signals from the six-component force sensor 64 (a plurality of piezoelectric elements) are amplified and converted into digital signals, measurement values of six component forces (forces Fx, Fy, and Fz in the X axis, the Y axis, and the Z axis direction, and moments Mx, My, and Mz about the respective axes) are calculated based on the digital signals. In the measurement unit 80, after the analog signal from the torque sensor 244 is amplified and converted into a digital signal, a measurement value of a torque of the test wheel W is calculated based on the digital signal.

Pieces of phase information detected by rotary encoders RE built in the motors 221, 351, 451, and 551, respectively, are input to the controller 70 via respective amplifiers 221*a*, 351*a*, 451*a*, and 551*a*.

The interface unit 90 includes, for example, one or more of a user interface for performing input and output with a user, a network interface for connecting to various networks such as a local area network (LAN), and various communication interfaces such as a universal serial bus (USB) and a general purpose interface bus (GPIB) for connecting to external devices. The user interface includes, for example, one or more of various operation switches, indicators, various display devices such as a liquid crystal display (LCD), various pointing devices such as a mouse and a touch pad, and various input/output devices such as a touch screen, a video camera, a printer, a scanner, a buzzer, a speaker, a microphone, and a memory card reader/writer.

The controller 70 drives the motor 221 of the torque applying unit 22 such that a deviation between the measured value and a target value of the torque of the test wheel W is eliminated. It is noted that the driving of the motor 221 may be controlled based on the measured value of the torque My detected by the six-component force sensor 64.

The above is the description of the embodiments according to aspects of the present disclosure. Embodiments according to aspects of the present disclosure are not limited to those described above, and various modifications are possible. For example, configurations obtained by appropriately combining configurations such as embodiments explicitly illustrated in the present specification and/or configurations such as embodiments obvious to those skilled in the art from the description in the present specification are also included in the embodiments of the present application.

In the above-described embodiments, the servomotors (the motors 221, 351, 451, and 551) are used to drive the torque applying unit 22 and the adjustment mechanisms (the load adjustment mechanism 30, the camber angle adjustment mechanism 40, and the slip angle adjustment mechanism 50) of the alignment unit 2*a*, respectively. However, other types of electric motor such as a DC servo motor or a stepping motor capable of controlling a driving amount (a rotation angle) may be used.

The toothed belt 228*b* in the above-described embodiments has core wires being steel wires. As the toothed belt 228*b*, a belt having core wires formed of so-called super fibers such as carbon fibers, aramid fibers, and ultrahigh molecular weight polyethylene fibers may be used. By using lightweight and high-strength core wires such as carbon core wires, it becomes possible to use a motor having a relatively low output, and it becomes possible to downsize the torque applying unit 22. A commonly used automotive or industrial timing belt may also be used as the toothed belt 228*b*.

The above-described embodiments are configured such that the braking force can be applied to the test wheel W by the two mechanisms, namely, the torque applying unit 22 and the disc brake 66. However, the braking force may be applied only by the torque applying unit 22 without providing the disc brake 66.

In the above-described embodiments, as illustrated in FIG. 4, the torque applying unit 22 and the power transmission unit 24 of the power unit 20 are installed on the lifting frame 31 and are configured to be movable vertically together with the axle unit 60. However, the entire power unit 20 may be installed on the base frame 10.

In the above-described embodiments, spur gears are used for the φ drive unit 45 of the camber angle adjustment mechanism 40 and the θ drive unit 55 of the slip angle adjustment mechanism 50. However, other types of gears such as a bevel gear, a cylindrical worm gear, and a face gear may be used instead.

In the above-described embodiments, in each of the first belt transmission mechanism 216 and the second belt transmission mechanism 228, a belt transmission mechanism in which a toothed belt is used as a winding intermediate node. However, at least one of the belt transmission mechanisms, a flat belt or a V-belt may be used in place of the toothed belt. In place of the belt mechanism, another type of winding transmission mechanism such as a chain transmission mechanism or a wire transmission mechanism, or other types of power transmission mechanism such as a ball screw mechanism, a gear transmission mechanism, or a hydraulic mechanism may be used.

In the above-described embodiments, a toothed belt having the same high rigidity as the toothed belt 228*b* of the second belt transmission mechanism 228 is used as the toothed belt 216*b* of the first belt transmission mechanism 216. However, since a large torque does not act on the first belt transmission mechanism 216, a toothed belt having lower rigidity such as a standard timing belt for a large vehicle may be used.

In the above-described embodiments, the pickup unit 21 that acquires power from the road surface is used as the rotation output unit. However, for example, a device including an electric motor such as a servo motor or an inverter motor capable of controlling the rotation speed, a hydraulic motor, an engine, or another type of prime mover may be used as the rotation output unit. In addition, a mechanism (e.g., a gear mechanism, a belt mechanism, or the like) that branches a portion of a power from a power transmission device of the vehicle 1 may be provided as the pickup unit 21.

What is claimed is:

1. A test unit for tire testing, the test unit comprising:

an axle unit configured to rotatably support a test wheel on which a test tire is mounted in a state where the test wheel is in contact with a road surface; and an alignment unit configured to adjust a load acting on the test wheel, wherein the alignment unit includes a load adjustment mechanism configured to adjust the load acting on the test wheel, wherein the load adjustment mechanism includes:

a first movable frame movable vertically;

linear guides configured to guide the vertical movement of the first movable frame; and a first drive unit configured to drive the first movable frame vertically, wherein the first movable frame has a substantially inverted U-shaped cross section when cut along a plane orthogonal to a rotation axis of the test wheel, and wherein the linear guides are on outer sides of the substantially inverted U-shape of the first movable frame so that the first movable frame is sandwiched by the linear guides.

2. The test unit according to claim 1, further comprising a base frame, wherein the linear guides each include:

a rail attached to one of the base frame and the first movable frame; and a carriage attached to the other of the base frame and the first movable frame and configured to travel on the rail, wherein the first drive unit includes:

a motion converter; and a second motor configured to drive the motion converter, wherein the motion converter includes:

a main body attached to the base frame; and a movable part that is movable vertically with respect to the main body, and wherein the first movable frame is fixed to the movable part.

3. The test unit according to claim 1, wherein the alignment unit further includes a camber angle adjustment mechanism configured to adjust a camber angle of the test wheel, and wherein the camber angle adjustment mechanism includes:

a second movable frame that is rotatable about an $E_\varphi$ axis parallel to a traveling direction;

a first pivot projecting from the second movable frame coaxially with the $E_\varphi$ axis;

a third bearing configured to rotatably support the first pivot; and a $\varphi$ drive unit configured to rotationally drive the second movable frame.

4. The test unit according to claim 3, further comprising a curved guide configured to guide rotation of the second movable frame.

5. The test unit according to claim 3, wherein the alignment unit further includes a slip angle adjustment mechanism configured to adjust a slip angle of the test wheel, and wherein the slip angle adjustment mechanism includes:

a third movable frame that is rotatable about an $E_\varphi$ axis orthogonal to each of an $E_\lambda$ axis, which is the rotation axis of the test wheel, and the $E_\varphi$ axis;

a second pivot projecting from the third movable frame coaxially with the $E_\theta$ axis;

a fourth bearing configured to rotatably support the second pivot; and a $\theta$ drive unit configured to rotationally drive the third movable frame.

6. The test unit according to claim 1, wherein the axle unit includes:

a spindle;

a fifth bearing configured to rotatably support the spindle; and a wheel hub coaxially attached to a distal end of the spindle and to which the test wheel is to be attached.

7. The test unit according to claim 6, wherein the axle unit includes a braking device configured to brake rotation of the spindle.

8. The test unit according to claim 7, further comprising:

a power unit configured to output power for rotationally driving the test wheel; and a power transmission unit configured to transmit power output from the power unit to the spindle, wherein the power transmission unit includes a sliding constant velocity joint having one end coupled to the spindle.

9. A test unit for tire testing, the test unit comprising:

an axle unit configured to rotatably support a test wheel on which a test tire is mounted in a state where the test wheel is in contact with a road surface; and an alignment unit configured to adjust an orientation of the test wheel, wherein the alignment unit includes a camber angle adjustment mechanism configured to adjust a camber angle of the test wheel, wherein the camber angle adjustment mechanism includes:

a second movable frame that is rotatable about an $E_\varphi$ axis parallel to a traveling direction;

curved guides configured to guide rotation of the second movable frame;

a first pivot projecting from the second movable frame coaxially with the $E_\varphi$ axis;

a third bearing configured to rotatably support the first pivot; and a $\varphi$ drive unit configured to rotationally drive the second movable frame, wherein the second movable frame has a substantially inverted U-shaped cross section when cut along a plane orthogonal to a rotation axis of the test wheel, and wherein the curved guides are on outer sides of the substantially inverted U-shape of the second movable frame so that the second movable frame is sandwiched by the curved guides.

10. The test unit according to claim 9, wherein the alignment unit further includes a slip angle adjustment mechanism configured to adjust a slip angle of the test wheel, and wherein the slip angle adjustment mechanism includes:

a third movable frame that is rotatable about an $E_\theta$ axis orthogonal to each of an $E_\lambda$ axis, which is the rotation axis of the test wheel, and the $E_\varphi$ axis;

a second pivot projecting from the third movable frame coaxially with the $E_\theta$ axis;

13 a fourth bearing configured to rotatably support the second pivot; and a θ drive unit configured to rotationally drive the third movable frame.

11. The test unit according to claim 9, wherein the axle unit includes:

a spindle;

a fifth bearing configured to rotatably support the spindle; and a wheel hub coaxially attached to a distal end of the spindle and to which the test wheel is to be attached.

\* \* \* \* \*

14